UNITED STATES PATENT OFFICE.

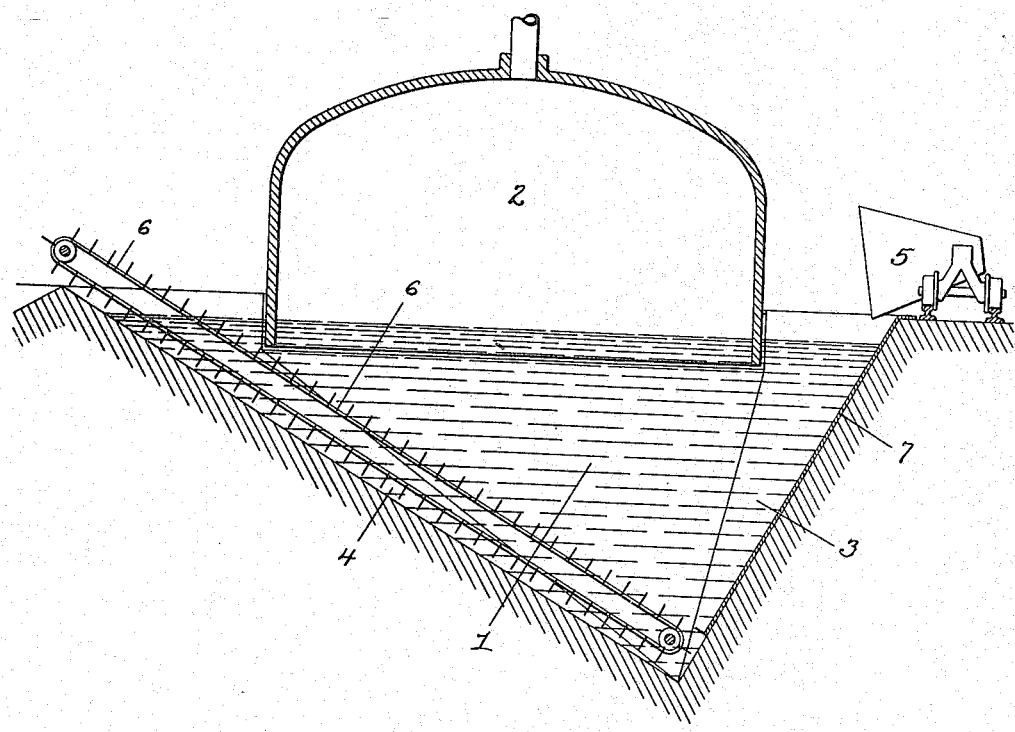
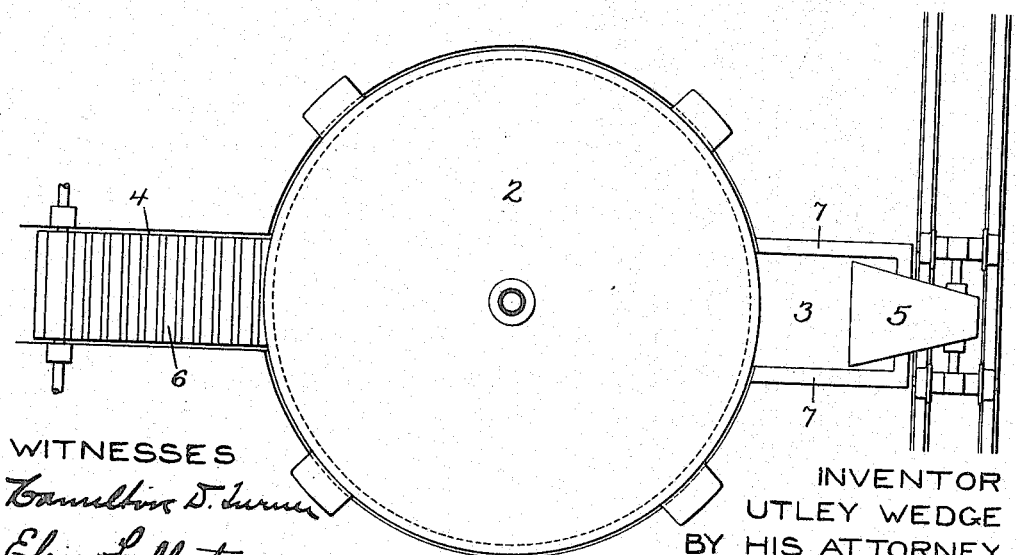

UTLEY WEDGE, OF ARDMORE, PENNSYLVANIA.

SLAG-HEATED STEAM-GENERATOR.

1,129,928.        Specification of Letters Patent.        Patented Mar. 2, 1915.

Application filed March 4, 1914. Serial No. 822,347.

*To all whom it may concern:*

Be it known that I, UTLEY WEDGE, a citizen of the United States, residing in Ardmore, Pennsylvania, have invented certain Improvements in Slag-Heated Steam-Generators, of which the following is a specification.

The object of my invention is to provide simple and effective means for generating steam by utilizing the heat of metallurgical furnace slags, gangues, or the like (hereinafter, for convenience, referred to as "slag"). This object I attain in the manner hereinafter set forth, reference being had to the accompanying drawing, in which—

Figure 1 is a vertical section of a steam generator constructed in accordance with my invention, and Fig. 2 is a top or plan view of the same.

Furnace slag is generally discharged from the furnace while in a molten condition or at extremely high temperature and different means have been proposed for the purpose of utilizing this heat in generating low pressure steam available for use as motive fluid in modern low pressure condensing engines, particularly those of the turbine type. In any effective device for this purpose moving mechanism likely to come into contact with the hot slag must be avoided, as the slag is often of a sticky character which would at once render said mechanism inoperative. My invention has therefore been designed with the view of overcoming this objection.

In the accompanying drawing, 1 represents a pit, tank or other suitable receptacle of any appropriate shape and dimensions, which is shown in the drawing as a pit and which will hereinafter be referred to as such. This pit contains a body of water and suitably mounted above the pit is a dome 2 whose lower edge extends so far below the level of the body of water as to be sealed thereby against the escape of steam from the dome. At opposite sides of the pit or otherwise suitably located therein the walls of the pit have depressions 3 and 4 constituting chutes, one (in the present instance that indicated at 3) being intended for the introduction of the hot slag into the body of water in the pit and the other (in the present instance that located at 4) being intended for the removal of the cold slag from said body of water.

Where the steam generator is located in relatively close proximity to the furnace the slag may be discharged directly from said furnace into the chute 3 or where this is not advisable the hot slag may be conveyed from the furnace to the generator, by means of a slag dumping car 5, or equivalent means. The discharge chute 4 is provided with suitable means for lifting the cold slag from the pit, such means in the present instance comprising an endless conveyer 6 with suitable flights, each of which removes a portion of slag from the mass or pile at the bottom of the pit, carries the same up the chute, and discharges it at the top of the latter, the use of such conveyer being rendered available by the fact that the sudden chilling of the hot slag by dumping it into the body of water in the pit causes a general disruption of the slag body and reduces the same to a roughly granular form. The steam rising from the surface of the water body is collected in the dome 2 and conveyed therefrom through any suitable pipe to the point at which it is to be utilized.

The pressure of steam contained in the dome 2 may be controlled by the depth of seal provided by the water body in the pit. I may say, however, that the apparatus is intended mainly for the generation of pressures below or but very slightly above that of the atmosphere so that the weight of the dome will be sufficient to retain the same in position, although as a precautionary measure the dome may be secured to the upper edge of the pit if desired by readily detachable fastenings.

I form the receiving and discharging chutes in the sides of the pit so as to lessen the area of the water body, exposed outside of the dome, from which steam can arise without being caught in said dome, but this construction is not essential to the broader embodiment of my invention as it is manifest that the dimensions of the pit may be so much greater than those of the dome as to provide, between the sides of the pit and the sides of the dome, space for the introduction and removal of the slag.

I prefer to form the pit with a tapering cross section so as to concentrate the body of slag in a contracted area at the bottom of the pit and thereby provide for the most effective action of the discharging conveyer but this feature also is not essential to the main purpose of my invention.

The bottom, or both the bottom and sides, of the feed chute 3 may have a removable lining 7 of metal or other suitable material whereby, in case the slag should adhere thereto in sufficient quantity to interfere with the free descent of following bodies of hot slag, the lining, with the mass of adhering slag can be removed, a clean lining substituted therefor, and the adhering mass removed from the first lining prior to the reuse of the same, or a fresh lining can be readily substituted for one which has become worn out in use.

By the use of the steam collecting dome sealed by the water in the pit the dome can be removed almost instantly when it is desired to gain access to the pit, and the formation of all steam-tight joints in the casing of the generator is rendered unnecessary, and by providing for the free and unobstructed entrance of the hot slag into the pit the clogging of the inlet by reason of the sticky character of the molten slag or the chilling of the same is prevented.

I claim:

1. In a steam generator for utilizing the heat of furnace slag, the combination of a pit containing a body of water, and a steam collecting dome having its lower edge sealed by said body of water.

2. In a steam generator for utilizing the heat of furnace slag, the combination of a pit containing a body of water, a steam collecting dome having its lower edge sealed by said body of water, means for the free introduction of the hot slag into said body of water, and means for removing the cold slag therefrom.

3. In a steam generator for utilizing the heat of furnace slag, the combination of a pit having slag-receiving and discharging chutes in the sides thereof, and containing a body of water which enters said chutes, and a steam collecting dome having its lower edge sealed by said body of water.

4. In a steam generator for utilizing the heat of furnace slag, the combination of a pit having a body of water therein, a steam collecting dome having its lower edge sealed by said body of water, and a slag feeding chute having a removable lining.

5. In a steam generator for utilizing the heat of furnace slag, the combination of a pit having a body of water therein, and a steam collecting dome mounted so as to be removable from said pit and having its lower edge sealed by the body of water therein.

In testimony whereof, I have signed my name to this specification in the presence of two subscribing witnesses.

UTLEY WEDGE.

Witnesses:
 FRANK H. RUDE,
 J. F. McTIERNAN.

Copies of this patent may be obtained for five cents each, by addressing the "Commissioner of Patents, Washington, D. C."